US011502630B2

(12) United States Patent
Abe et al.

(10) Patent No.: US 11,502,630 B2
(45) Date of Patent: Nov. 15, 2022

(54) FLUID APPARATUS

(71) Applicant: DAIKIN INDUSTRIES, LTD., Osaka (JP)

(72) Inventors: Takahiro Abe, Saka (JP); Atsushi Suhara, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 375 days.

(21) Appl. No.: 16/954,478

(22) PCT Filed: Dec. 13, 2018

(86) PCT No.: PCT/JP2018/045934
§ 371 (c)(1),
(2) Date: Jun. 16, 2020

(87) PCT Pub. No.: WO2019/124222
PCT Pub. Date: Jun. 27, 2019

(65) Prior Publication Data
US 2020/0313585 A1 Oct. 1, 2020

(30) Foreign Application Priority Data

Dec. 20, 2017 (JP) .............................. JP2017-244362

(51) Int. Cl.
*H02K 9/04* (2006.01)
*H02K 9/24* (2006.01)
(Continued)

(52) U.S. Cl.
CPC .............. *H02P 9/006* (2013.01); *F03B 15/18* (2013.01); *H02K 9/00* (2013.01); *H02K 9/04* (2013.01);
(Continued)

(58) Field of Classification Search
CPC .......... H02P 9/006; H02P 29/60; H02P 29/68; H02P 2101/10; F03B 15/00; F03B 15/18;
(Continued)

(56) References Cited

U.S. PATENT DOCUMENTS 6,587,737 B2 * 7/2003 Voser .................... G05B 17/02
703/2
11,041,476 B2 * 6/2021 Abe ........................ F03B 15/08
(Continued)

FOREIGN PATENT DOCUMENTS

CN 101289990 A 10/2008
EP 2 848 801 A1 3/2015
(Continued)

OTHER PUBLICATIONS

European Search Report of corresponding EP Application No. 18 89-621.8 dated Mar. 23, 2021.
(Continued)

*Primary Examiner* — Pedro J Cuevas
(74) *Attorney, Agent, or Firm* — Global IP Counselors, LLP (57) ABSTRACT

A fluid apparatus includes a hydraulic machine, a rotary electric machine connected to the hydraulic machine, and a power conversion controller that converts power from the rotary electric machine. A non-normal operation is performed in a warning state that differs from a normal state in which a normal operation is continued and an anomalous state in which operation is stopped to continue a stopped condition.

15 Claims, 5 Drawing Sheets

(51) Int. Cl.
 *F03B 15/18* (2006.01)
 *H02P 29/68* (2016.01)
 *H02K 9/12* (2006.01)
 *H02P 9/00* (2006.01)
 *H02K 9/00* (2006.01)
 *H02P 101/10* (2015.01)

(52) U.S. Cl.
 CPC .............. *H02K 9/24* (2013.01); *H02P 29/68* (2016.02); *H02K 9/12* (2013.01); *H02P 2101/10* (2015.01)

(58) Field of Classification Search
 CPC ....... F05B 2260/20; Y02E 10/20; H02K 9/00; H02K 9/04; H02K 9/12
 See application file for complete search history.

(56) References Cited

U.S. PATENT DOCUMENTS

| | | | | |
|---|---|---|---|---|
| 11,118,558 | B2* | 9/2021 | Abe | F03B 15/04 |
| 11,313,343 | B2* | 4/2022 | Abe | F03B 15/02 |
| 11,415,978 | B2* | 8/2022 | Celia | H04B 17/23 |
| 2002/0052712 | A1* | 5/2002 | Voser | G05B 17/02 |
| | | | | 702/182 |
| 2012/0086204 | A1* | 4/2012 | Re | F03B 13/00 |
| | | | | 290/43 |
| 2014/0046881 | A1* | 2/2014 | Losl | G06N 20/00 |
| | | | | 706/14 |
| 2015/0369258 | A1 | 12/2015 | Sakamoto et al. | |
| 2016/0248357 | A1* | 8/2016 | Mori | F03B 15/00 |
| 2017/0314527 | A1* | 11/2017 | Sakamoto | F03B 15/16 |
| 2019/0271291 | A1* | 9/2019 | Abe | F03B 13/10 |
| 2019/0331086 | A1* | 10/2019 | Abe | H02P 9/008 |
| 2020/0386202 | A1* | 12/2020 | Abe | H02P 9/04 |
| 2022/0010764 | A1* | 1/2022 | Suhara | F03B 15/12 |
| 2022/0213864 | A1* | 7/2022 | Abe | H02P 9/04 |

FOREIGN PATENT DOCUMENTS

| | | |
|---|---|---|
| EP | 2 966 297 A1 | 1/2016 |
| JP | 59-68572 A | 4/1984 |
| JP | 62-43538 A | 2/1987 |
| JP | 63-111599 A | 5/1988 |
| JP | 10-77948 A | 3/1998 |
| JP | 5573982 B2 | 8/2014 |
| JP | 5573983 B2 | 8/2014 |
| JP | 2016-17424 A | 2/2016 |

OTHER PUBLICATIONS

International Preliminary Report of corresponding PCT Application No. PCT/JP2018/045934 dated Jun. 23, 2020.

International Search Report of corresponding PCT Application No. PCT/JP2018/045934 dated Feb. 19, 2019.

* cited by examiner

FLUID APPARATUS

CROSS-REFERENCE TO RELATED APPLICATIONS

This U.S. National stage application claims priority under 33 U.S.C. § 119(a) to Japanese Patent Application No. 2017-244362, filed in Japan on Dec. 20, 2017, the entire contents of which are hereby incorporated herein by reference.

BACKGROUND

Field of the Invention

The present disclosure relates to a fluid apparatus.

Background Information

A conventional hydroelectric generator serving as a fluid apparatus includes, for example, a water turbine and a generator (refer to, for example, Japanese Patent No. 5573983).

SUMMARY

The above fluid apparatus undergoes inspections at regular intervals. If an anomaly occurs in the fluid apparatus, the anomalous fluid apparatus is stopped. Thus, in addition to the regular inspections, the fluid apparatus needs to undergo an irregular inspection to resume operation. This increases man-hours for inspection and maintenance costs.

It is an object of the present disclosure to provide a fluid apparatus that restricts an increase in man-hours for inspection.

A fluid apparatus according to a first aspect includes a hydraulic machine (11), a rotary electric machine (12) connected to the hydraulic machine (11), and a power conversion controller (13, 14) that converts power from the rotary electric machine 2), in which a non-normal operation is performed in a warning state that differs from a normal state in which a normal operation is continued and an anomalous state in which operation is stopped to continue a stopped condition.

The fluid apparatus according to the first aspect continues operation so as not to increase man-hours for inspection or the like.

The fluid apparatus according to a second aspect further includes a detection unit (63) that detects the warning state and issues a notification of the detection of the warning state.

The fluid apparatus according to the second aspect allows for a warning state to be recognized, and an inspection can be conducted to prevent the occurrence of an anomalous state in advance.

In the fluid apparatus according to a third aspect, at least one of an occurrence time, an inspection exemptionable period, a subject location, a maintenance component, and an installation site is notified in accordance with the warning state.

The fluid apparatus according to the third aspect allows for recognition of the warning state in detail and reduces man-hours for inspection.

In the fluid apparatus according to a fourth aspect, an inspection waiting period until a next scheduled inspection date is obtained, and when the inspection waiting period is longer than an inspection exemptionable period, a notification is issued to have an inspection conducted so that the inspection waiting period becomes shorter than or equal to the inspection exemptionable period.

The fluid apparatus according to the fourth aspect does not need to conduct an inspection when a non-normal operation is performed. This can reduce the number of inspections.

The fluid apparatus according to a fifth aspect further includes a clock unit (63) that measures an elapsed time from when the warning state is detected, in which operation is stopped when the elapsed time measured by the clock unit exceeds an inspection exemptionable period.

The fluid apparatus according to the fifth aspect prevents the non-normal operation from being continuously performed.

The fluid apparatus according to a sixth aspect further includes a cooler (36, 37) that cools the rotary electric machine (12), and a temperature detector (53b) that is arranged to detect a temperature of the rotary electric machine (12), in which the power conversion controller (13, 14) is configured to transfer heat to the rotary electric machine (12), and the temperature detector (53b) is spaced apart from the power conversion controller (13, 14).

The fluid apparatus according to the sixth aspect identifies an overheated location (whether cooler that cools rotary electric machine (12) or power conversion controller (13, 14)) based on the temperature (temperature change) detected by the temperature detector (53b).

In the fluid apparatus according to a seventh aspect, when a temperature of at least one of the rotary electric machine (12) or the power conversion controller (13, 14) exceeds a predetermined value, an operation point of the non-normal operation is changed to increase an effective head (H) of the hydraulic machine (11).

The fluid apparatus according to the seventh aspect can lower current, torque, or generated power to lower temperature (reduce heat generation) by increasing the effective head (H) of the hydraulic machine (11). An increase in a flow rate for the cooler improves the cooling capability of the cooler.

DETAILED DESCRIPTION OF EMBODIMENT(S)

A fluid apparatus will now be described. It should be noted that the present disclosure is not limited to the examples described in the following description, but is intended to include equivalents of the claims and all modifications included in the scope of the claims.

Figure 1:
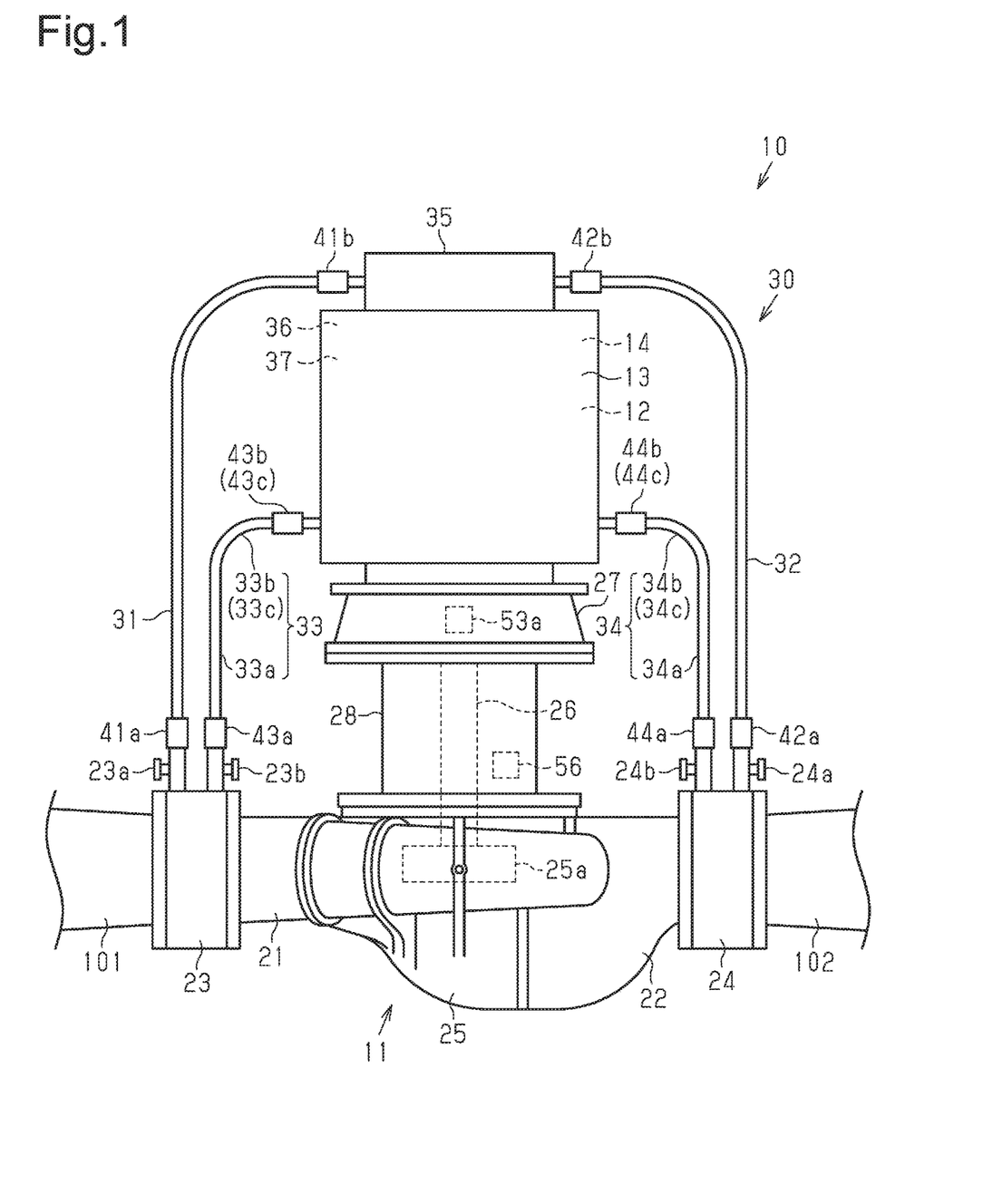
FIG. 1 is a schematic front view of a fluid apparatus.

As shown in FIG. 1, a water turbine 11 of a fluid apparatus 10 includes an inlet pipe 21 and an outlet pipe 22 that are extended in the horizontal direction. The inlet pipe 21 is connected by a pipe joint 23 to a water supply pipe 101 that supplies the water turbine 11 with water, which is a fluid. The outlet pipe 22 is connected by a pipe joint 24 to a water discharging pipe 102 that discharges water from the water turbine 11. The water supply pipe 101 and the water discharging pipe 102 are main pipes through which water flows in and out of the water turbine 11. The fluid apparatus 10 of the present embodiment is of an in-line type where an inlet channel and an outlet channel of a water flow, which are formed with the water supply pipe 101, the inlet pipe 21, the outlet pipe 22, and the water discharging pipe 102, are arranged in a straight line.

The water turbine 11 includes a casing 25 that incorporates a bladed wheel 25a. The bladed wheel 25a is arranged in a water flow channel formed by the inlet pipe 21 and the outlet pipe 22. The bladed wheel 25a is connected to the lower end of a rotary shaft 26 arranged in the vertical direction. The bladed wheel 25a includes blades spirally arranged on its central portion to which the rotary shaft 26 is connected. When the blades receive the pressure of a water flow from the inlet pipe 21, the bladed wheel 25a is rotated to rotate the rotary shaft 26. An impeller for a centrifugal pump may be used as the bladed wheel 25a. The inlet pipe 21, the outlet pipe 22, the bladed wheel 25a attached to the rotary shaft 26, a hollow base that surrounds the rotary shaft 26, and the casing 25 form the water turbine (hydraulic machine) 11, which receives a water flow to rotate and drive the rotary shaft 26.

A generator (rotary electric machine) 12 is connected to the upper end of the rotary shaft 26, which is arranged in vertical direction, above the water turbine 11. A front cover 27 arranged below the generator 12 is fastened, by fasteners such as bolts, to a hollow base 28 that surrounds the rotary shaft 26 of the water turbine 11 so that the water turbine and the generator are detachably coupled and fixed to each other. The fluid apparatus 10 is of a vertical type where the water turbine 11 and the generator 12 are arranged in the vertical direction.

The generator 12 is coupled to the rotary shaft 26 of the water turbine 11. The generator 12 is rotated and driven by the bladed wheel 25a to generate predetermined alternating-current power (such as three-phase alternating-current power).

Figure 2:
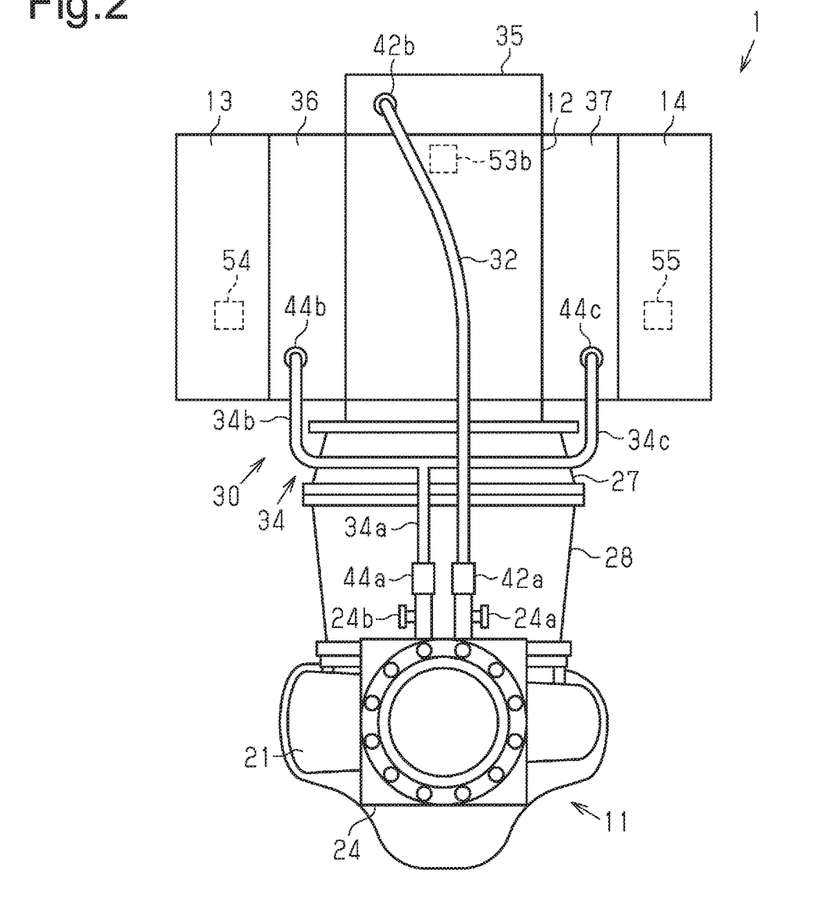
FIG. 2 is a schematic side view of the fluid apparatus.

A generator controller 13 (first power conversion controller) is arranged at one side of the generator 12 (left side in FIG. 2). The generator controller 13 converts or controls power generated by the generator 12 or power supplied from a power source. The generator controller 13 includes an AC/DC converter (converter unit) that converts three-phase alternating-current power generated by, for example, the generator 12 into direct-current power.

A grid interconnection inverter (hereafter simply referred to as inverter) 14 (second power conversion controller) is arranged at the other side of the generator 12 (right side in FIG. 2). The inverter 14 further converts or controls power that is converted or controlled by the generator controller 13. The inverter 14 is a DC/AC converter that converts a direct-current power, which is converted by, for example, the generator controller 13, into alternating-current power. The alternating-current power converted by the generator controller 13 is supplied to a power grid 16 shown in FIG. 4.

The generator controller 13 includes semiconductor devices such as insulated gate bipolar transistors (IGBTs) for power conversion. The inverter 14 includes semiconductor devices (such as IGBTs) for power conversion. The semiconductor devices generate heat during operation. The generator 12 generates heat during power generation. Thus, the fluid apparatus 10 includes a cooling system 30 that cools the generator controller 13, the inverter 14, and the generator 12.

As shown in FIGS. 1 and 2, the cooling system 30 includes cooling inlet pipes 31, 33, cooling outlet pipes 32, 34, and coolers 35, 36, 37.

The cooling inlet pipe 31 is arranged between the pipe joint 23 and the cooler 35. The cooling inlet pipe 31 is connected by a coupler 41a to a valve 23a installed on the pipe joint 23. The cooling inlet pipe 31 is also connected to the cooler 35 by a coupler 41b. The cooling outlet pipe 32 is arranged between the cooler 35 and the pipe joint 24. The cooling outlet pipe 32 is connected to the cooler 35 by a coupler 42b. The cooling outlet pipe 32 is also connected by a coupler 42a to a valve 24a installed on the pipe joint 24. The couplers 41a, 41b, 42a, 42b are, for example, one-touch couplers, and facilitate the connection of pipes in the fluid apparatus 10. The valves 23a, 24a may be manual on-off valves that are operated to close during installation and maintenance or open during test operations and normal operations.

The cooling inlet pipe 33 is arranged between the pipe joint 23 and the coolers 36, 37 shown in FIG. 2. The cooling inlet pipe 33 is connected by a coupler 43a to a valve 23b installed on the pipe joint 23. The cooling inlet pipe 33 includes a shared pipe 33a and branched pipes 33b, 33c that are branched from the shared pipe 33a and connected to the coolers 36, 37 (refer to FIG. 2). The branched pipes 33b, 33c are connected to the coolers 36, 37 by couplers 43b, 43c, respectively. The cooling outlet pipe 34 is arranged between the pipe joint 24 and the coolers 36, 37 shown in FIG. 2. The cooling outlet pipe 34 includes branched pipes 34b, 34c and a shared pipe 34a. The branched pipes 34b, 34c are connected to the coolers 36, 37 by couplers 44b, 44c. The branched pipes 34b, 34c merge into the shared pipe 34a. The shared pipe 34a is connected to a valve 24b of the pipe joint 24 by a coupler 44a. The couplers 43a to 43c, 44a to 44c may be one-touch couplers that facilitate the connection of pipes in the fluid apparatus 10. The valves 23b, 24b may be manual on-off valves that are operated to close during installation and maintenance or open during test operations and normal operations.

FIGS. 1 and 2 show the cooler 35 arranged on the generator 12. However, the cooler 35 is formed by a cooling pipe arranged to, for example, meander around the generator 12. The cooling inlet pipe 31 supplies the cooler 35 with some of the water flowing through the water supply pipe 101 as fluid for cooling (cooling fluid). The cooling outlet pipe 32 returns (discharges) water from the cooler 35 to the water discharging pipe 102. The fluid for cooling cools the generator 12.

The cooler 36 is arranged between the generator controller 13 and the generator 12. The cooler 37 is arranged between the inverter 14 and the generator 12. The cooling inlet pipe 33 supplies the coolers 36, 37 with some of the water flowing through the water supply pipe 101 as fluid for cooling (cooling fluid). The cooling outlet pipe 34 returns (discharges) water from the coolers 36, 37 to the water discharging pipe 102. The fluid for cooling cools the generator 12, the generator controller 13, and the inverter 14.

The configuration related to control of the fluid apparatus 10 will now be described.

Figure 4:
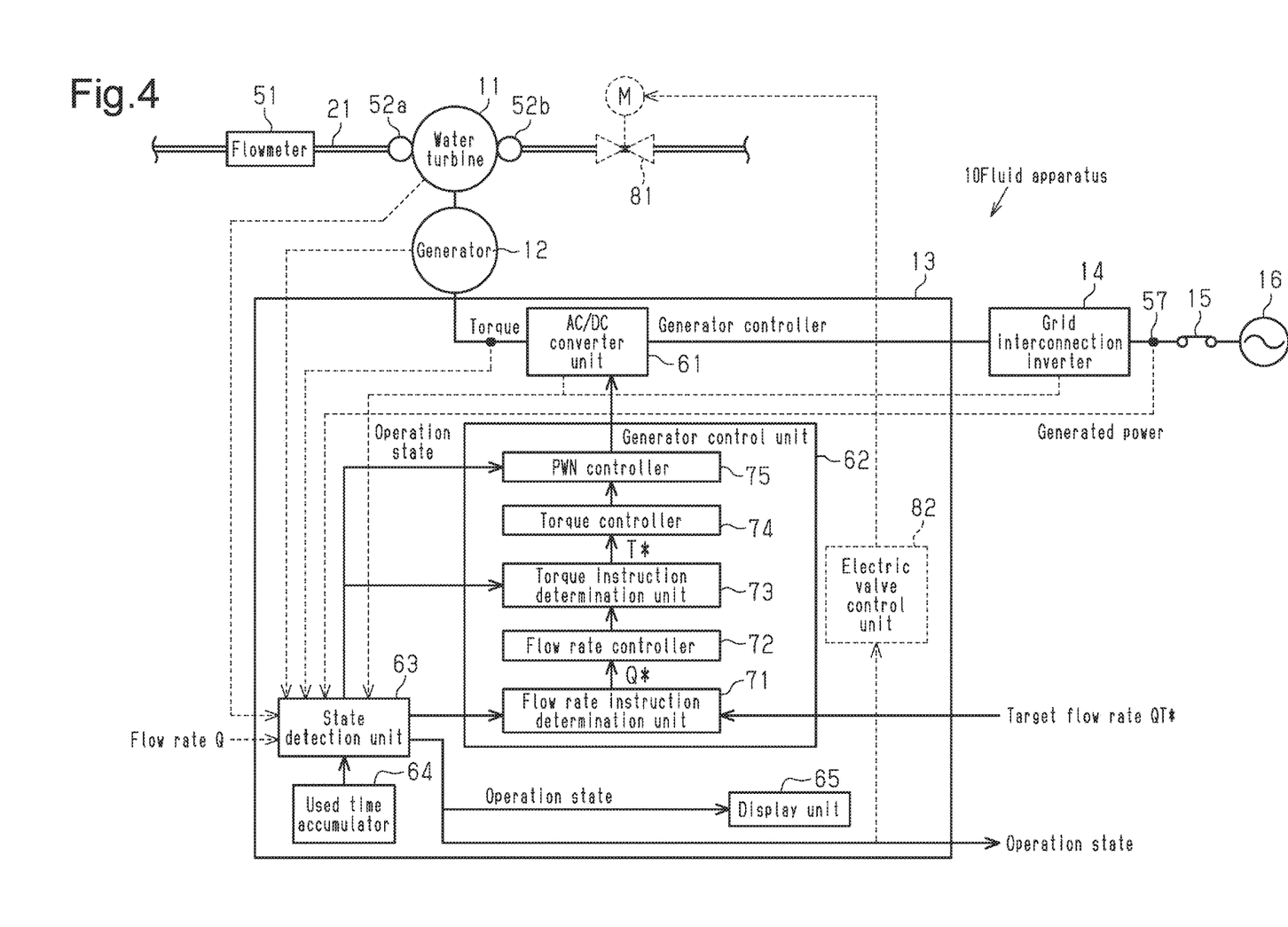
FIG. 4 is a block diagram showing a control system and a power grid of the fluid apparatus.

As shown in FIG. 4, a flowmeter 51 is arranged in the inlet pipe 21. The flowmeter 51 measures flow rate Q of the fluid (water) supplied to the water turbine 11.

The water turbine 11 includes a pressure sensor 52a, arranged at an inlet side, and a pressure sensor 52b, arranged at an outlet side. The pressure sensor 52a measures primary pressure p1 of the water turbine 11. The pressure sensor 52b measures secondary pressure p2 of the water turbine 11.

Figure 3:
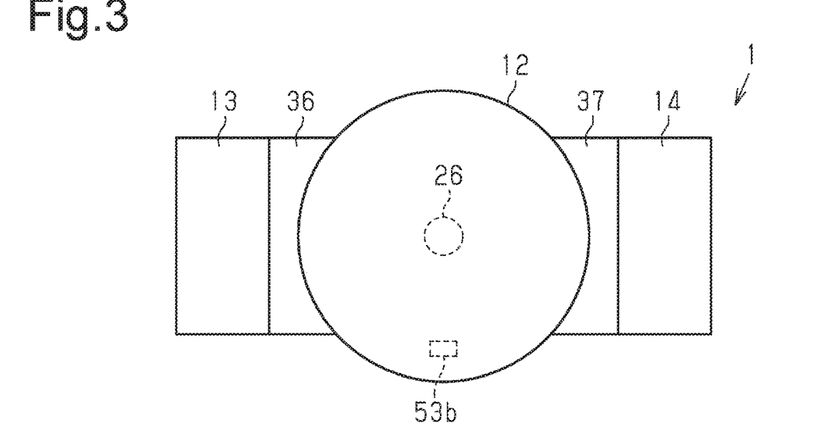
FIG. 3 is a schematic plan view of the fluid apparatus.

As shown in FIGS. 1, 2, and 3, the generator 12 includes temperature sensors (temperature detectors) 53a, 53b that detect the temperature of the generator 12. The temperature sensor 53a shown in FIG. 1 is arranged to detect the temperature of a hearing (not shown) that supports, for example, the rotary shaft 26. The temperature sensor 53b shown in FIG. 2 is arranged to detect the temperature of a winding of the generator 12. In the present embodiment, the temperature sensor 53b is arranged at a location spaced apart from the generator controller 13 and the inverter 14 as shown in FIG. 3. The temperature sensor 53b is arranged, for example, at the periphery of the generator 12 that is on an imaginary line extending in the direction orthogonal to a straight line that extends through the center of the generator 12 and is connected to the generator controller 13 and the inverter 14 as shown in FIG. 3.

As shown in FIG. 2, the generator controller 13 includes a temperature sensor 54, and the inverter 14 includes a temperature sensor 55. The temperature sensor 54 is arranged to detect the temperature of a power device (such as IGBT) included in the generator controller 13. The temperature sensor 55 is arranged to detect the temperature of a power device (such as IGBT) included in the inverter 14.

The water turbine 11 includes a water level sensor 56. The level sensor 56 is arranged to detect a change in a water level caused by a water leak or the like in the water turbine 11. In the water turbine 11, water may leak when, for example, deterioration occurs in a sealing member such as an O-ring that seals a gap between the casing 25 and the rotary shaft 26, to which the bladed wheel 25a is attached. Thus, the level sensor 56 detects a change in a water level caused by such a water leak.

As shown in FIG. 4, a wattmeter 57 is arranged at an output side of the inverter 14. The wattmeter 57 detects the output power of the inverter 14, namely, the generated power. The wattmeter 57 may be replaced with a voltmeter and an ammeter.

A configuration example of the generator controller 13 will now be described.

As shown in FIG. 4, the generator controller 13 (first power conversion controller) includes an AC/DC converter unit (hereafter "converter unit") 61 and a generator control unit 62 that controls the converter unit 61. The converter unit 61 converts alternating-current power generated by the generator 12 into direct-current power. The direct-current power is supplied to the inverter 14. The inverter 14 is connected to the power grid 16 by a disconnection unit 15. The power grid 16 is, for example, a commercial power source. The disconnection unit 15 opens and closes between the inverter 14 and the power grid 16. An electromagnetic relay, for example, may be used as the disconnection unit 15.

Figure 5:
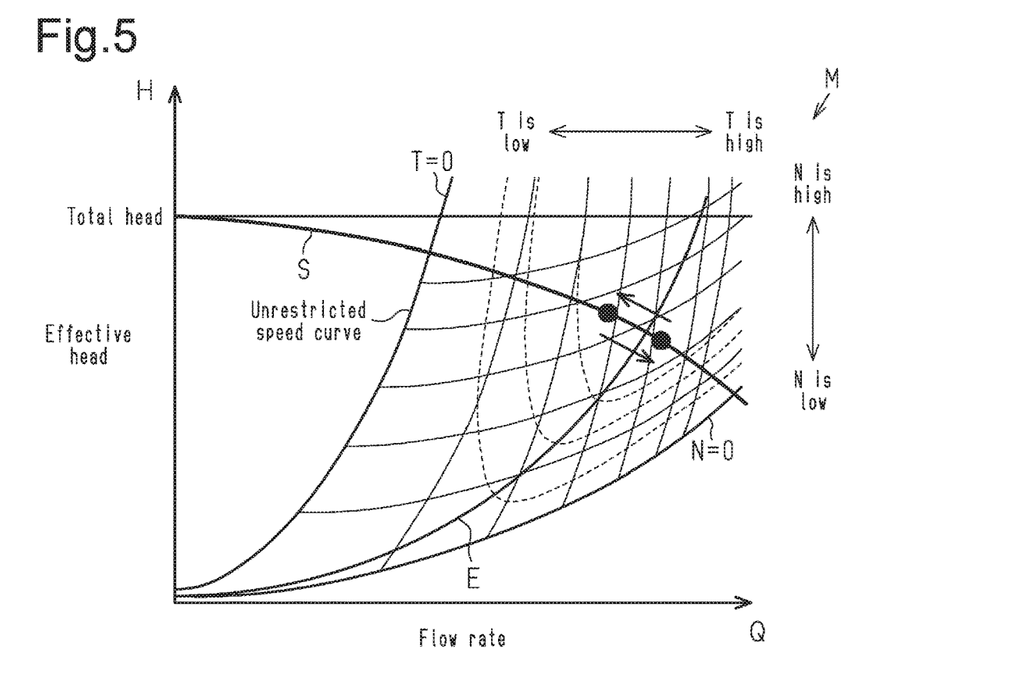
FIG. 5 is a diagram showing a characteristic map of control for the fluid apparatus.

FIG. 5 shows characteristic map M that is stored in advance in the generator control unit 62. The generator control unit 62 controls the converter unit 61 based on characteristic map M. In characteristic map M, the vertical axis represents the effective head (H) of the water turbine 11 and the horizontal axis represents the flow rate (Q) to the water turbine 11. In characteristic map M, a water turbine range in which the water turbine 11 is rotated by a water flow is a range between an unrestricted speed curve taken when load is not applied to the generator 12 and torque is zero (T=0) and a constant speed curve taken when the number of rotations is zero (N=0). The water turbine 11 is basically rotated in the water turbine range to drive the generator 12.

Constant torque curves in the water turbine range extend in correspondence with the unrestricted speed curve (T=0), and torque increases as flow rate Q increases in the map. Constant speed curves extend in correspondence with the constant speed curve in which the number of rotations is zero (N=0), and the number of rotations increases as effective head H increases. Further, constantly generated power curves shown by broken lines are quadratic curves that bulge downward, and generated power increases as effective head H and flow rate Q increase. A curve (maximum power curve E) connecting the apexes of the constantly generated power curves is a maximum generated power/efficiency curve by which the generator 12 obtains the maximum generated power or the maximum efficiency.

In characteristic map M, a total head-pipeline resistance curve (system loss curve S), which is measured and prepared in advance, is recorded as a fluid resistance curve. System loss curve S corresponds to the resistance of a pipe to which the fluid apparatus 10 is connected. System loss curve S has effective head H that is equal to total head Ho when flow rate Q=0 is satisfied, and effective head H decreases in a quadric curve as flow rate Q increases. The curvature of system loss curve S has a value specific to a pipeline to which the fluid apparatus 10 is connected. The water turbine 11 of the fluid apparatus 10 operates using points on system loss curve S as operation points.

The generator control unit 62 includes a flow rate instruction determination unit 71, a flow rate controller 72, a torque instruction determination unit 73, a torque controller 74, and a PWN controller 75. The flow rate instruction determination unit 71 generates flow rate instruction value Q* based on target flow rate QT* and an operation state of the fluid apparatus 10 detected by a state detection unit 63. The flow rate controller 72 sets a target torque based on flow rate instruction value Q*. The torque instruction determination unit 73 generates torque instruction value T* based on the target torque and the operation state of the fluid apparatus 10 detected by the state detection unit 63. The torque controller 74 controls torque so that torque T of the generator 12 corresponds to torque instruction value T* from the torque instruction determination unit 73. This applies a predetermined load to the generator 12. The PWN controller 75 generates, based on an output of the torque controller 74 and the operation state of the fluid apparatus 10 detected by the state detection unit 63, a gate signal sent to semiconductor devices (e.g., IGBT) included in the converter unit 61. The PWN controller 775 generates the gate signal that intermittently switches on and off the semiconductor devices based on, for example, predetermined carrier frequencies.

The generator controller 13 includes the state detection unit 63 (clock unit), a used time accumulator 64, and a display unit 65.

The state detection unit 63 detects the operation state of the fluid apparatus 10. The operation states set for the fluid apparatus 10 include a normal state, a warning state, and an anomalous state. The normal state indicates that the fluid apparatus 10 has no anomaly. In other words, the fluid apparatus 10 is allowed to operate continuously. The anomalous state indicates that the fluid apparatus 10 has an anomaly and can no longer be operated. In other words, the operation of the fluid apparatus 10 needs to be emergency-stopped. The warning state is neither the normal state nor the anomalous state. The warning state indicates, for example, that the fluid apparatus 10 has an anomaly although operation can be continued for a limited time. In other words, the fluid apparatus 10 in the warning state has an anomaly and will have to be stopped in the future. The continuation of operation for a limited time is, for example, the period from the detection of an anomaly to when stopping is required.

The state detection unit 63 detects which one of a normal state, an anomalous state, and a warning state that the operation state of the fluid apparatus 10 is in. The state detection unit 63 outputs the detected operation state. The operation state of the fluid apparatus 10 output by the state detection unit 63 includes causes of the warning state and the anomalous state and values indicating the states of the causes.

The generator control unit 62 controls the converter unit 61 in accordance with the operation state detected by the state detection unit 63. As described above, the operation states include a normal state, a warning state, and an anomalous state.

In a normal state, the generator control unit 62 continues the current operation (normal operation). The normal operation allows the fluid apparatus 10 to operate at operation points, which are set to obtain the maximum generated power in characteristic map M shown in FIG. 5. The normal operation may control pressure based on operation points that are set to obtain a predetermined pressure. The normal operation may control a flow rate based on operation points that are set to obtain a predetermined flow rate.

In an anomalous state, the generator control unit 62 stops operation of the fluid apparatus 10 to continue a stopped condition.

In a warning state, the generator control unit 62 performs a non-normal operation that is less functional than the normal operation. The non-normal operation controls the converter unit 61 or the like to extend the limited time of continued operation or cancel the warning state in relation with the cause of the warning state. For example, if the warning state is caused by a rise in temperature, the non-normal operation controls the fluid apparatus 10 so that the rise in temperature becomes gradual or so that the temperature decreases.

During a non-normal operation of the fluid apparatus 10, the operation state of the fluid apparatus 10 may be changed. The state detection unit 63 continuously detects the operation state of the fluid apparatus 10 and outputs the operation state. The generator control unit 62 controls the fluid apparatus 10 in response to the operation state detected by the state detection unit 63.

When the operation state changes from a warning state to a normal state, that is, returns to a normal state, the state detection unit 63 outputs the operation state (normal state) of the fluid apparatus 10. The state detection unit 63 resets the elapsed time of the warning state. The generator control unit 62 controls the fluid apparatus 10 in the normal operation based on the operation state. When the operation state changes from a warning state to an anomalous state, the state detection unit 63 outputs the operation state (anomalous state) of the fluid apparatus 10. The generator control unit 62 stops the fluid apparatus 10 based on the operation state.

When the operation state remains in a warning state, the state detection unit 63 determines control of the fluid apparatus 10 based on a time elapsed from when the warning state was determined. The state detection unit 63 stores, for example, an inspection exemptionable period. The inspection exemptionable period indicates, for example, a period during which operation can be continued without an inspection while a non-normal operation is being performed. When the elapsed time of the warning state is less than the inspection exemptionable period (elapsed time<inspection exemptionable period), the state detection unit 63 continues the non-normal operation and notifies an external device of the operation state (e.g., operation in warning state) so that this will be inspected in the next inspection (e.g., monthly conducted regular inspection). When the elapsed time of the warning state is greater than the inspection exemptionable period (elapsed time>inspection exemptionable period), the state detection unit 63 outputs the operation state (anomalous state) to stop the operation of the fluid apparatus 10 and notifies the external device of the operation state (e.g., operation stop after warning state). The operation state may be notified to the external device together with the content of the warning state or the content of the anomalous state.

The notified operation state includes at least one of an occurrence time, an inspection exemptionable period, a subject location, a maintenance component, or an installation site. The occurrence time indicates when an anomaly or a warning has occurred, specifically, the time at which the state detection unit 63 detected an anomalous state or a warning state. The inspection exemptionable period indicates the period during which operation can be continued without an inspection. The subject location indicates where an anomaly or a warning has occurred. The maintenance component indicates a component for replacement or repair of where the anomaly or the warning has occurred. The installation site indicates where the fluid apparatus 10 is installed. The notification of the operation state including at least one of the above items informs the operation state in greater detail than a notification merely indicating the occurrence of an anomaly or warning, thereby reducing man-hours for inspection and repair.

The used time accumulator 64 accumulates and outputs the used time of the fluid apparatus 10. Further, the used time accumulator 64 resets (clears) the used time to 0 in response to a reset signal of the state detection unit 63 and then accumulates the used time of the fluid apparatus 10 from the cleared time (=0).

The display unit 65 displays the operation state of the fluid apparatus 10 that has been notified from the state detection unit 63. The display unit 65 may employ indicator lamps (e.g., LED), a display panel such as an LCD, or the like. Indicator lamps are switched on in accordance with the operation state of the fluid apparatus 10 or illuminated in a color that corresponds to the operation state. A display panel indicates the operation state using characters or colors.

As described above, the state detection unit 63 notifies the external device of the operation state of the fluid apparatus 10. The state detection unit 63 has, for example, a communication function and is connected to an external communication line (wired or wireless) so that the state detection unit 63 transmits the operation state of the fluid apparatus 10 via the communication line. The communication line is connected to, for example, a monitoring device. The monitoring device receives the operation state via the communication line and displays the operation state of the fluid apparatus 10 on a display device. In addition, the operation state of the fluid apparatus 10 may be transmitted to a terminal of a maintenance engineer via the communication line.

State detection will now be described in detail.

The operation state of the fluid apparatus 10 includes causes of the warning state and the anomalous state and values indicating the states of the causes. The state detection unit 63 detects the operation state of the fluid apparatus 10 using various types of detectors (sensors) arranged at predetermined locations of the fluid apparatus 10.

An example of the warning state detected by the state detection unit 63 and a corresponding non-normal operation (change in operation points) will now be described.

Bearing Overheating

The state detection unit 63 detects bearing overheating based on the temperature detected by the temperature sensor 53*a* shown in FIG. 1. The state detection unit 63 compares the temperature detected by the temperature sensor 53*a* with a threshold temperature to detect bearing overheating. In this case, the non-normal operation may decrease the number of rotations of the water turbine 11 (bladed wheel 25*a*) shown in FIG. 1. For example, operation points are changed to decrease rotation number N in characteristic map M shown in FIG. 5. The decrease in the number of rotations lowers the temperature of the bearing.

Power Device Overheating

The state detection unit 63 detects overheating of a power device (such as IGBT) based on temperatures detected by temperature sensors 54, 55 shown in FIG. 2. The state detection unit 63 compares the temperatures detected by the temperature sensors 54, 55 with a threshold temperature to detect power device overheating. In this case, the non-normal operation may lower current, torque, or generated power. For example, operation points are changed to decrease torque T in characteristic map M shown in FIG. 5. The non-normal operation may lower carrier frequencies or change a modulation method (from three-phase modulation to two-phase modulation) in the PWN controller 75. This lowers the temperature of the power device.

The non-normal operation may change operation points to increase effective head H. Effective head H is obtained from the difference between primary pressure p1 detected by the pressure sensor 52*a* and secondary pressure p2 detected by the pressure sensor 52*b* (=p1−p2) shown in FIG. 4. In this case, the flow rate for the cooling inlet pipe 33 shown in FIG. 1 is increased to raise the cooling performance of the coolers 36, 37. This cools the power device.

Generator Overheating

The state detection unit 63 detects overheating of the generator 12 (overheating of winding) based on the temperature detected by the temperature sensor 53*b* shown in FIG. 2. The state detection unit 63 compares the detected temperature with a threshold temperature to detect generator overheating. In this case, the non-normal operation may lower current, torque, or generated power in the same manner as during power device overheating. The non-normal operation may also lower an iron loss, for example, lower the number of rotations or carrier frequencies. The non-normal operation may change operation points to increase effective head H in the same manner as during power device overheating.

Water Leak

The state detection unit 63 detects a water leak based on the duration of use of the fluid apparatus 10 or a water level detected by the level sensor 56. A water leak is caused by deterioration of a sealing member such as an O-ring. In this case, the non-normal operation may change operation points to lower effective head H or flow rate Q.

Clogging of Cooling Pipes

The state detection unit 63 detects clogging of cooling pipes based on temperatures detected by the temperature sensors 53*b*, 54, 55 shown in FIG. 2. The state detection unit 63 stores a cooling failure threshold. The cooling failure threshold is set to be lower than the threshold for detecting overheating (overheating protection threshold). The state detection unit 63 compares detected temperatures with the cooling failure threshold to detect clogging of the cooling pipes. In this case, the non-normal operation may be performed in the same manner as during power device overheating and generator overheating.

Exceeding Generated Power Upper Limit Value

The state detection unit 63 detects exceeding of the generated power upper limit value based on the power detected by the wattmeter 57 shown in FIG. 4. Power may be obtained from a voltmeter and an ammeter. In this case, the non-normal operation may change operation points to lower current, torque, or generated power in the same manner as during power device overheating Exceeding Over-Torque Threshold of Generator The state detection unit 63 detects torque based on an output of the generator 12 and detects exceeding of an over-torque threshold of the generator based on the detected torque. In this case, the non-normal operation may change operation points to lower current, torque, or generated power in the same manner as during power device overheating.

Exceeding of Flow Rate Upper Limit Value

The state detection unit 63 detects exceeding of the flow rate upper limit value based on flow rate Q detected by the flowmeter 51 shown in FIG. 4. In this case, the non-normal operation may change operation points to lower flow rate Q.

End of Life

The state detection unit 63 detects the end of life of the bearing, the sealing member, or the like based on a used time accumulated by the used time accumulator 64 shown in FIG. 4. In this case, the non-normal operation may change operation points to lower effective head H or flow rate Q.

The clogging of the cooling pipe will now be described in detail as an example of the warning state and the non-normal operation.

As described above, the state detection unit 63 detects clogging of the cooling pipes based on the temperatures detected by the temperature sensors 53*b*, 54, 55 shown in FIG. 2. A rise in temperature detected by the temperature sensors 53*b*, 54, 55, that is, a rise in the temperatures of the generator 12, the generator controller 13, and the inverter 14, is caused by clogging of foreign material in the cooling pipes (cooling inlet pipes 31, 33 and cooling outlet pipes 32, 34) and stagnant fluid (water) in the cooling pipes. In other words, when the fluid apparatus 10 is installed, an installation failure of the cooling pipes (connection failure, error in opening operation of valves 23*a*, 23*b*, 24*a*, 24*b*) is also detected as clogging of the cooling pipes. For example, during testing prior to operation, the detection of the clogging of the cooling pipes as described above allows an installation failure to be detected. Clogging of foreign material can also be detected by detecting clogging of the cooling pipes subsequent to operation. The clogging of the cooling pipes includes clogging of pipes in the coolers 35, 36, 37 that are supplied with fluid.

A detection process may use a temperature change per time (dT/dt). In this case, the clogging of the cooling pipes is determined if dT/dt is greater than the cooling failure threshold.

The temperature sensor 53*b* of the generator 12 is arranged at a location spaced apart from the generator controller 13 and the inverter 14 as shown in FIGS. 2 and 3. Thus, the temperature sensor 53*b* is less likely to be affected by a change in the temperatures of the generator controller 13 and the inverter 14. The temperature sensors 54, 55 of the generator controller 13 and the inverter 14 are each arranged near the corresponding power device and less likely to be affected by a change in the temperature of the generator 12. This allows for determination of whether an installation failure or foreign material clogging is occurring in the cooling inlet pipes 31, 33 or the cooling outlet pipes 32, 34 based on a change in the temperatures of the temperature sensors 53b, 54, 55. In the case of the clogging caused by foreign material, a non-normal operation may be performed by changing operation points to increase effective head H so that the flow rate for the cooling inlet pipe 33 is increased and the cooling inlet pipe 33 is cleaned to remove foreign material.

The state detection unit 63 detects the operation state based on a used time accumulated by the used time accumulator 64 and outputs or the like from various types of detectors. The fluid apparatus 10 is required to undergo inspections at regular intervals (monthly inspection, annual inspection, or the like). The state detection unit 63 stores an inspection period (inspection cycle). The state detection unit 63 obtains a period until the next inspection (inspection waiting period) based on the used time and the inspection cycle. If the inspection waiting period is longer than the inspection exemptionable period (e.g., one week), the state detection unit 63 notifies the generator control unit 62 and the external device of an anomalous state. The generator control unit 62 stops power generation based on the notified anomalous state.

If the inspection waiting period is shorter than the inspection exemptionable period (e.g., one week), the state detection unit 63 notifies the generator control unit 62 and the external device of a warning state. The generator control unit 62 performs a non-normal operation based on the notified warning state.

If the inspection waiting period is longer than the inspection exemptionable period, the state detection unit 63 may issue a notification prompting an inspection to be conducted so that the inspection waiting period becomes shorter than or equal to the inspection exemptionable period. In this case, an inspection does not need to be conducted in a hasty manner and an inspection for the fluid apparatus 10 can be scheduled. For example, the period for conducting a regular inspection can be shifted so that the number of inspections does not increase. Further, inspection may be scheduled together with other fluid apparatuses 10 that are located nearby to reduce man-hours for inspection (movement amount and personnel for conducting inspection). When the elapsed time is beyond the inspection exemptionable period, the state detection unit 63 issues a notification indicating that the operation state is an anomalous state. The fluid apparatus 10 stops in accordance with the notification. This prevents the non-normal operation from being continuously performed.

The non-normal operation will now be described using changes in the temperature sensor 53b of the generator 12 as an example.

Figure 7:
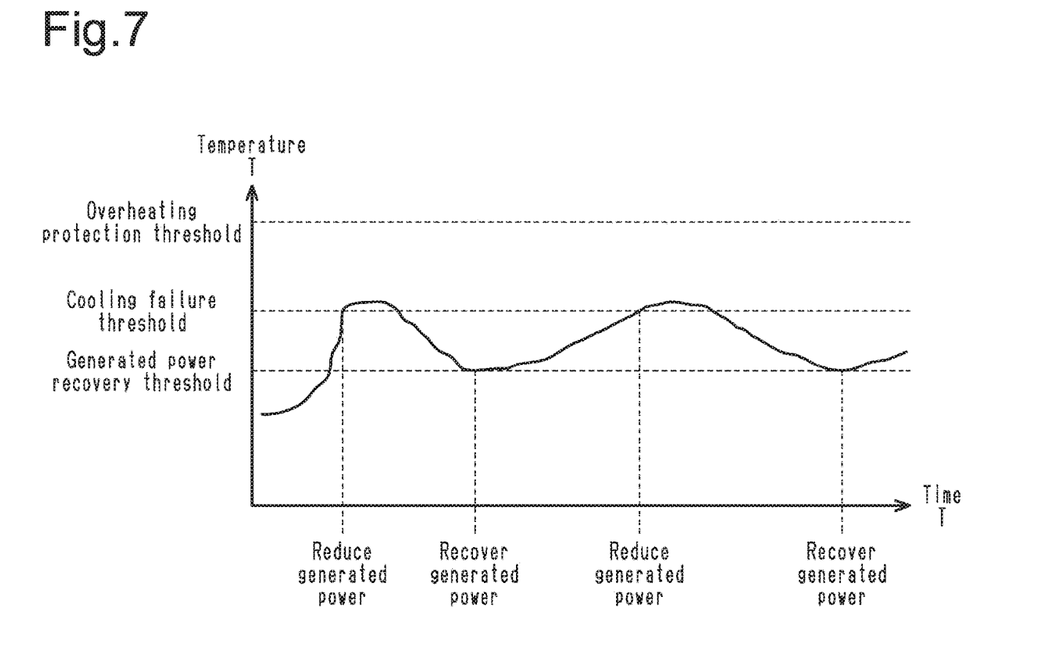
FIG. 7 is a waveform chart showing a temperature change in the fluid apparatus.

FIG. 7 shows changes in the temperature detected by the temperature sensor 53b, that is, temperature changes of the generator 12. When the temperature rises and exceeds the cooling failure threshold, the state detection unit 63 detects generator overheating as a warning state and issues a notification indicating that the operation state is a warning state. The generator control unit 62 decreases the current and reduces the generated power based on the notified operation state (warning state). If the rated value of generated power in the normal operation is 22 kW, the generated power in the non-normal operation is lowered to 11 kW. The reduced generated power lowers the temperature of the generator 12.

When the temperature becomes lower than a generated power recovery threshold, the state detection unit 63 determines that the warning state has changed to a normal state, that is, returned to a normal state, and issues a notification indicating that the operation state is a normal state. The generator control unit 62 controls the fluid apparatus 10 at the predetermined operation points based on the notified operation state (normal state) to recover the generated power.

When the temperature rises and exceeds the cooling failure threshold, the state detection unit 63 detects generator overheating as a warning state and issues a notification indicating that the operation state is a warning state. When the temperature becomes lower than the generated power recovery threshold, the state detection unit 63 determines that the warning state has changed to a normal state, that is, returned to a normal state, and issues a notification indicating that the operation state is a normal state.

In this manner, when the reduced generated power lowers the temperature of the generator 12, power generation is continued although the generated power is lower than the normal state. This increases the accumulated amount of generated power compared to when the fluid apparatus 10 is stopped due to a rise in temperature. The non-normal operation does not require an irregular inspection to be conducted on the fluid apparatus 10 and reduces the frequency of irregular inspections.

Figure 8:
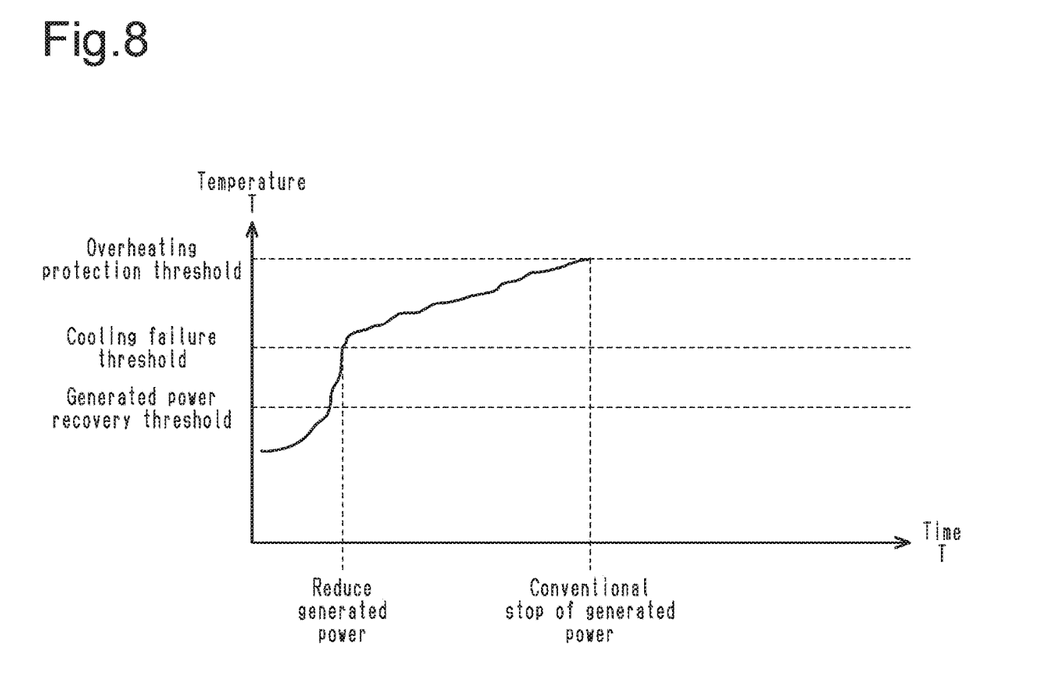
FIG. 8 is a waveform chart showing a temperature change in the fluid apparatus.

In another example, as shown in FIG. 8, when the temperature rises and exceeds the cooling failure threshold, the state detection unit 63 detects generator overheating as a warning state and issue a notification indicating that the operation state is a warning state. The generator control unit 62 decreases the current and reduces the generated power based on the notified operation state (warning state).

The temperature may not decrease depending on the value set for a non-normal operation. If the rated value of generated power in a normal operation is 22 kW and the generated power in a non-normal operation is lowered to, for example, 21 kW, the temperature will rise as shown in FIG. 8. In this case, the temperature rises and reaches the overheating protection threshold. Such a case is an anomalous state and the fluid apparatus 10 stops operation. This reduces the time during which the non-normal operation is continued. Accordingly, in the non-normal operation, the generated power is preferably set so as to not to raise the temperature, and the generated power is preferably set to lower the temperature.

The state detection unit 63 detects that the operation state is an anomalous state and issues a notification of the operation state. The generator control unit 62 stops the operation of the fluid apparatus 10 based on the operation state (anomalous state). In this manner, the fluid apparatus 10 is stopped in accordance with the operation state.

Anomaly detection in the generator controller 13, the inverter 14, and the coolers 36, 37 will now be described.

The generator controller 13 is connected to the generator 12 by the cooler 36, and the inverter 14 is connected to the generator 12 by the cooler 37. The heat of the generator controller 13 is transferred to the generator 12 via the cooler 36, and the heat of the inverter 14 is transferred to the generator 12 via the cooler 37. The temperature sensor 53b of the generator 12 detects the temperature of the generator 12 and the temperatures transferred from the generator controller 13 and the inverter 14 via the coolers 36, 37.

If the generator controller 13 is overheated and the cooler 36 is normal, the heat of the generator controller 13 is prevented from reaching the generator 12. Accordingly, the temperature sensor 53b installed in the generator 12 detects only a small change in temperature. In this case, the temperature sensor 54 of the generator controller 13 detects overheating of the generator controller 13 (power device overheating). If the generator controller 13 is normal and the cooler 36 is anomalous, the temperature sensor 54 of the generator controller 13 detects a rise in temperature. The heat of the generator controller 13 is transferred to the generator 12. Thus, the temperature sensor 53b detects a rise in temperature. This allows the anomaly in the cooler 36 (clogging of cooling pipe) to be detected. The same applies to the inverter 14 and the cooler 37. In this manner, anomalous locations (generator controller 13, inverter 14, or coolers 36, 37) can be identified.

Control of the flow rate and pressure will now be described.

If a reverse pump turbine is used as the water turbine 11, the water turbine 11 will operate at operation points of system loss curve S shown in characteristic map M of FIG. 5. Raising (lowering) torque T, raising (lowering) rotation number N, raising (lowering) flow rate Q, and raising (lowering) effective head H have the same meaning. When detecting power device overheating or motor overheating as a warning state, the flow rate can be lowered by changing the operation points of the water turbine. This lowers the generated power without using an electric valve.

Figure 6:
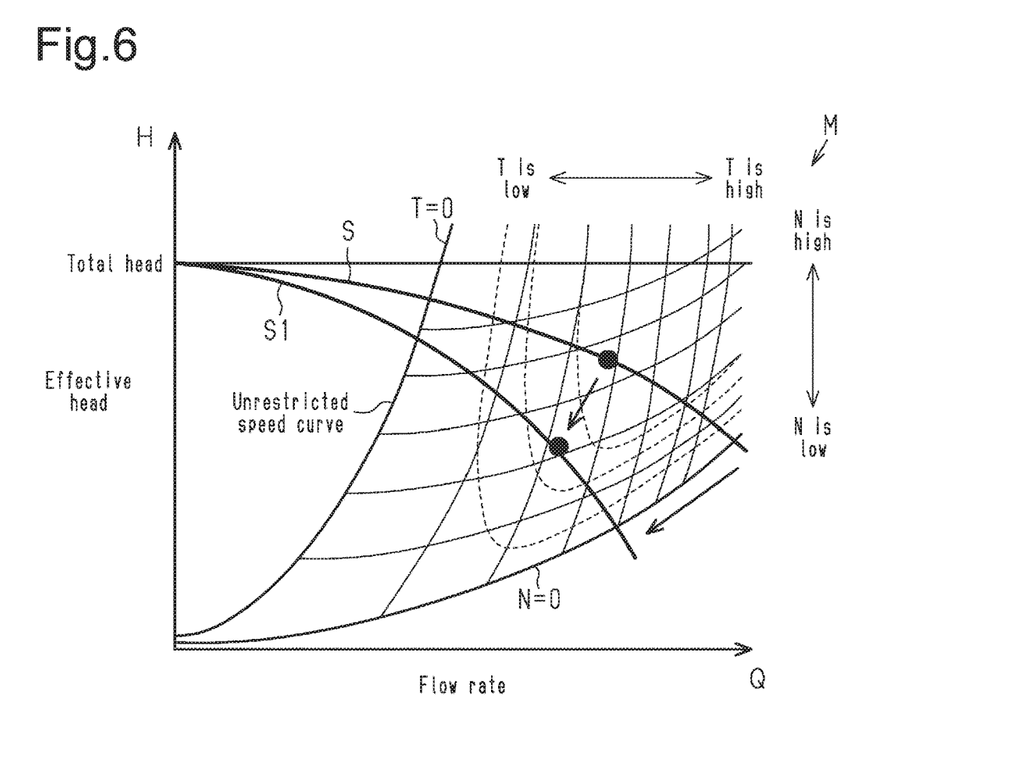
FIG. 6 is a diagram showing a characteristic map of control for the fluid apparatus.

As shown by the broken lines in FIG. 4, an electric valve 81 is arranged at a primary side or a secondary side of the water turbine 11, and an electric valve control unit 82 is arranged in the generator controller 13 to control the open degree of the electric valve. This allows a non-normal operation to be performed in accordance with a warning state. For example, when detecting a water leak and the end of life as the warning state, plural types of control are necessary to lower flow rate Q and effective head H at the same time. In this case, system loss curve S1 is changed as shown in FIG. 6 by adjusting the open degree of the electric valve 81. This lowers torque T, rotation number N, flow rate Q, and effective head H at the same time. Thus, when a non-normal operation is performed due to a number of causes, the non-normal operation can lower the generated power.

As described above, the present embodiment has the following advantages.

(1) The fluid apparatus 10 includes the water turbine 11, the generator 12 connected to the water turbine 11, and the generator controller 13 that converts power from the generator 12. In a warning state that differs from a normal state that continues a normal operation and an anomalous state that stops operation to continue the stopped condition, the generator controller 13 performs a non-normal operation. The non-normal operation continues operation so as not to increase man-hours for inspection or the like. The non-normal operation continues power generation to increase the accumulated amount of generated power.

(2) The state detection unit 63 of the generator controller 13 detects and issues a notification of the operation state of the fluid apparatus 10. The operation state of the fluid apparatus 10 can be recognized from the notification. When the notification indicates that the operation state is a warning state, an inspection can be conducted to prevent the occurrence of an anomalous state in advance.

(3) A warning state notified by the state detection unit 63 includes at least one of an occurrence time, an inspection exemptionable period, a subject location, a maintenance component, or an installation site. This allows for recognition of the warning state in detail and reduces man-hours for inspection.

(4) The state detection unit 63 stores an inspection period (inspection cycle). The state detection unit 63 obtains the period until the next inspection (inspection waiting period) based on the used time and the inspection cycle. If the inspection waiting period is longer than the inspection exemptionable period, the state detection unit 63 issues a notification to prompt an inspection so that the inspection waiting period becomes shorter than or equal to the inspection exemptionable period. In this case, for example, the period for conducting a regular inspection can be shifted so that an irregular inspection does not need to be conducted in a hasty manner and so that the number of inspections can be reduced.

(5) The generator controller 13 is connected to the generator 12 by the cooler 36, and the inverter 14 is connected to the generator 12 by the cooler 37. The heat of the generator controller 13 is transferred to the generator 12 via the cooler 36, and the heat of the inverter 14 is transferred to the generator 12 via the cooler 37. The temperature sensor 53b of the generator 12 detects the temperature of the generator 12 and the temperatures transferred from the generator controller 13 and the inverter 14 via the coolers 36, 37. This allows anomalous locations (generator controller 13, inverter 14, or coolers 36, 37) to be identified.

Other Embodiments

The above embodiment may be modified as follows.

The non-normal operation automatically returns to the normal operation in accordance with temperature as shown in FIG. 7. Instead, the non-normal operation may manually return to the normal operation.

The non-normal operation may lower generated power in stages.

Pressure may be controlled instead of the flow rate.

The generator controller 13 includes the converter unit 61 that is separate from the inverter 14. Instead, the generator controller 13 and the inverter 14 may be integrally configured.

Although the embodiments have been described above, it will be understood that various changes in form and details can be made without departing from the spirit and scope of the claims.

What is claimed is:

1. A fluid apparatus comprising:
a hydraulic machine;
a rotary electric machine connected to the hydraulic machine; and
a power conversion controller configured to convert power from the rotary electric machine,
a non-normal operation being performed in a warning state that differs from a normal state in which a normal operation is continued and an anomalous state in which operation is stopped to continue a stopped condition.

2. The fluid apparatus according to claim 1, further comprising:
a detection unit configured to detect the warning state and issue a notification of detection of the warning state.

3. The fluid apparatus according to claim 2, wherein
at least one of an occurrence time, an inspection exemptionable period, a subject location, a maintenance component, and an installation site is notified in accordance with the warning state.

4. The fluid apparatus according to claim 3, wherein
an inspection waiting period until a next scheduled inspection date is obtained, and
when the inspection waiting period is longer than an inspection exemptionable period, a notification is issued to have an inspection conducted so that the inspection waiting period becomes shorter than or equal to the inspection exemptionable period.

5. The fluid apparatus according to claim 3, further comprising:
a clock unit configured to measure an elapsed time from when the warning state is detected, operation being stopped when the elapsed time measured by the clock unit exceeds an inspection exemptionable period.

6. The fluid apparatus according to claim 3, further comprising:
a cooler configured to cool the rotary electric machine; and
a temperature detector arranged to detect a temperature of the rotary electric machine,
the power conversion controller being further configured to transfer heat to the rotary electric machine, and
the temperature detector being spaced apart from the power conversion controller.

7. The fluid apparatus according to claim 2, further comprising;
a clock unit configured to measure an elapsed time from when the warning state is detected, operation being stopped when the elapsed time measured by the clock unit exceeds an inspection exemptionable period.

8. The fluid apparatus according to claim 7, further comprising:
a cooler configured to cool the rotary electric machine; and
a temperature detector arranged to detect a temperature of the rotary electric machine,
the power conversion controller being further configured to transfer heat to the rotary electric machine, and
the temperature detector being spaced apart from the power conversion controller.

9. The fluid apparatus according to claim 2, wherein
an inspection waiting period until a next scheduled inspection date is obtained, and
when the inspection waiting period is longer than an inspection exemptionable period, a notification is issued to have an inspection conducted so that the inspection waiting period becomes shorter than or equal to the inspection exemptionable period.

10. The fluid apparatus according to claim 2, further comprising:
a cooler configured to cool the rotary electric machine; and
a temperature detector arranged to detect a temperature of the rotary electric machine,
the power conversion controller being further configured to transfer heat to the rotary electric machine, and
the temperature detector being spaced apart from the power conversion controller.

11. The fluid apparatus according to claim 1, wherein
an inspection waiting period until a next scheduled inspection date is obtained, and
when the inspection waiting period is longer than an inspection exemptionable period, a notification is issued to have an inspection conducted so that the inspection waiting period becomes shorter than or equal to the inspection exemptionable period.

12. The fluid apparatus according to claim 11, further comprising:
a clock unit configured to measure an elapsed time from when the warning state is detected, operation being stopped when the elapsed time measured by the clock unit exceeds an inspection exemptionable period.

13. The fluid apparatus according to claim 11, further comprising:
a cooler configured to cool the rotary electric machine; and
a temperature detector arranged to detect a temperature of the rotary electric machine,
the power conversion controller being further configured to transfer heat to the rotary electric machine, and
the temperature detector being spaced apart from the power conversion controller.

14. The fluid apparatus according to claim 1, further comprising:
a cooler configured to cool the rotary electric machine; and
a temperature detector arranged to detect a temperature of the rotary electric machine,
the power conversion controller being further configured to transfer heat to the rotary electric machine, and
the temperature detector being is spaced apart from the power conversion controller.

15. The fluid apparatus according to claim 14, wherein
when a temperature of at least one of the rotary electric machine or the power conversion controller exceeds a predetermined value, an operation point of the non-normal operation is changed to increase an effective head of the hydraulic machine.

* * * * *